United States Patent [19]

Eberly, Jr.

[11] 4,282,086
[45] Aug. 4, 1981

[54] REFORMING WITH MULTIMETALLIC CATALYSTS

[75] Inventor: Paul E. Eberly, Jr., Baton Rouge, La.

[73] Assignee: Exxon Research & Engineering Co., Florham Park, N.J.

[21] Appl. No.: 79,577

[22] Filed: Sep. 27, 1979

Related U.S. Application Data

[60] Division of Ser. No. 969,548, Dec. 14, 1978, Pat. No. 4,213,881, which is a continuation-in-part of Ser. No. 862,114, Dec. 19, 1977, Pat. No. 4,148,758, and Ser. No. 862,116, Dec. 19, 1977, Pat. No. 4,151,115, each, said Ser. No. 862,114, and Ser. No. 862,116, is a continuation-in-part of Ser. No. 826,996, Aug. 23, 1977, abandoned.

[51] Int. Cl.³ .......................................... C10G 35/06
[52] U.S. Cl. .................................. 208/139; 252/439
[58] Field of Search ........................................ 208/139

[56] References Cited

U.S. PATENT DOCUMENTS

| 3,884,799 | 5/1975 | Mahoney et al. ..................... 208/139 |
| 4,169,043 | 9/1979 | Eberly ................................. 208/139 |

Primary Examiner—Curtis R. Davis
Attorney, Agent, or Firm—Llewellyn A. Proctor

[57] ABSTRACT

A process for desensitizing a hypersensitive, high activity reforming catalyst for suppression of hydrogenolysis which is particularly acute during the early portion of the period that the catalyst is placed on stream, i.e., at the startup of a reactor. The catalyst is constituted of a composite which includes a Group VIII nobel metal hydrogenation-dehydrogenation component, notably platinum, and iridium or rhenium, or both, and sulfurous acid or sulfuric acid, or both. Hydrogenolysis is suppressed by use of the catalyst during reforming.

3 Claims, 2 Drawing Figures

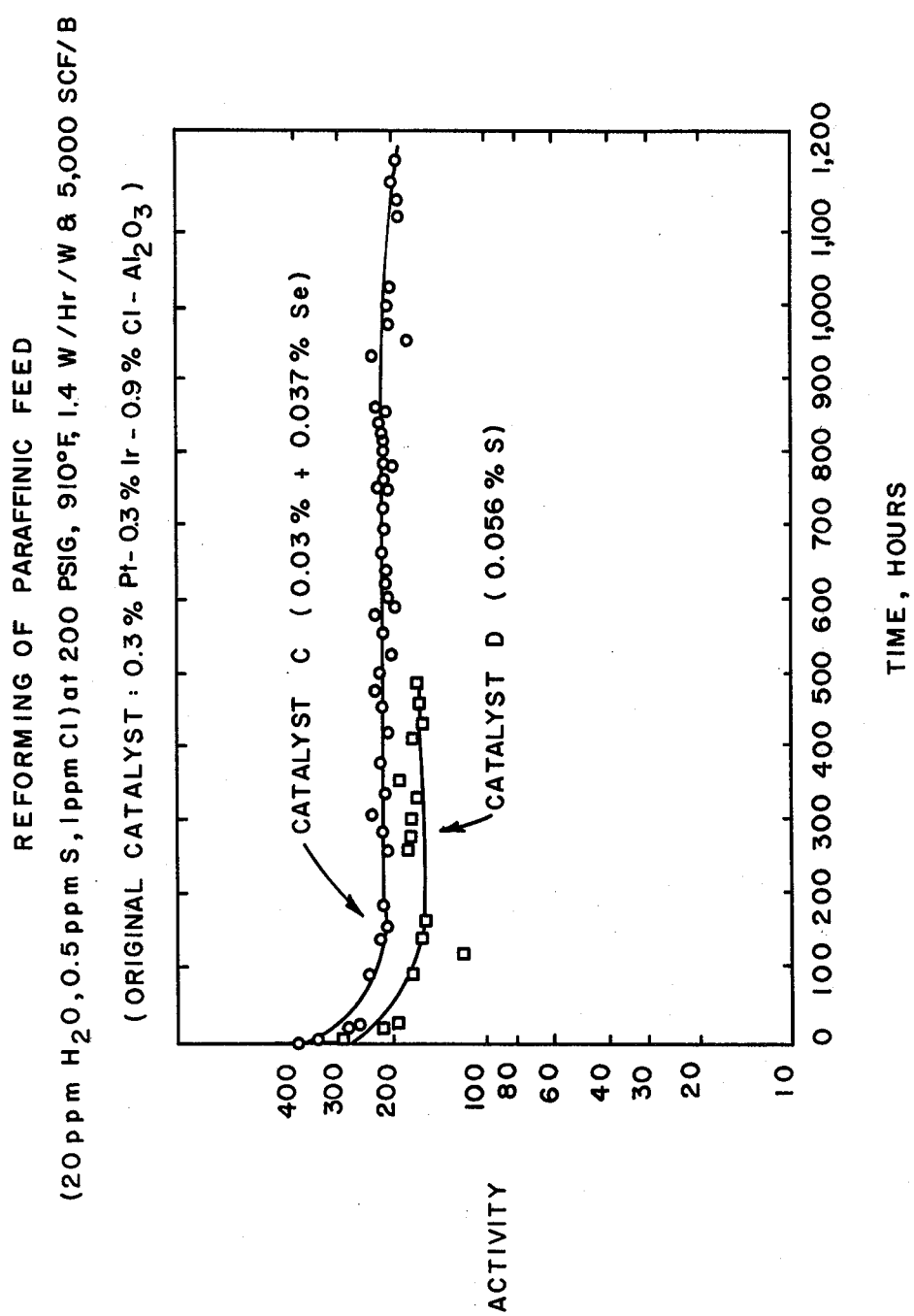

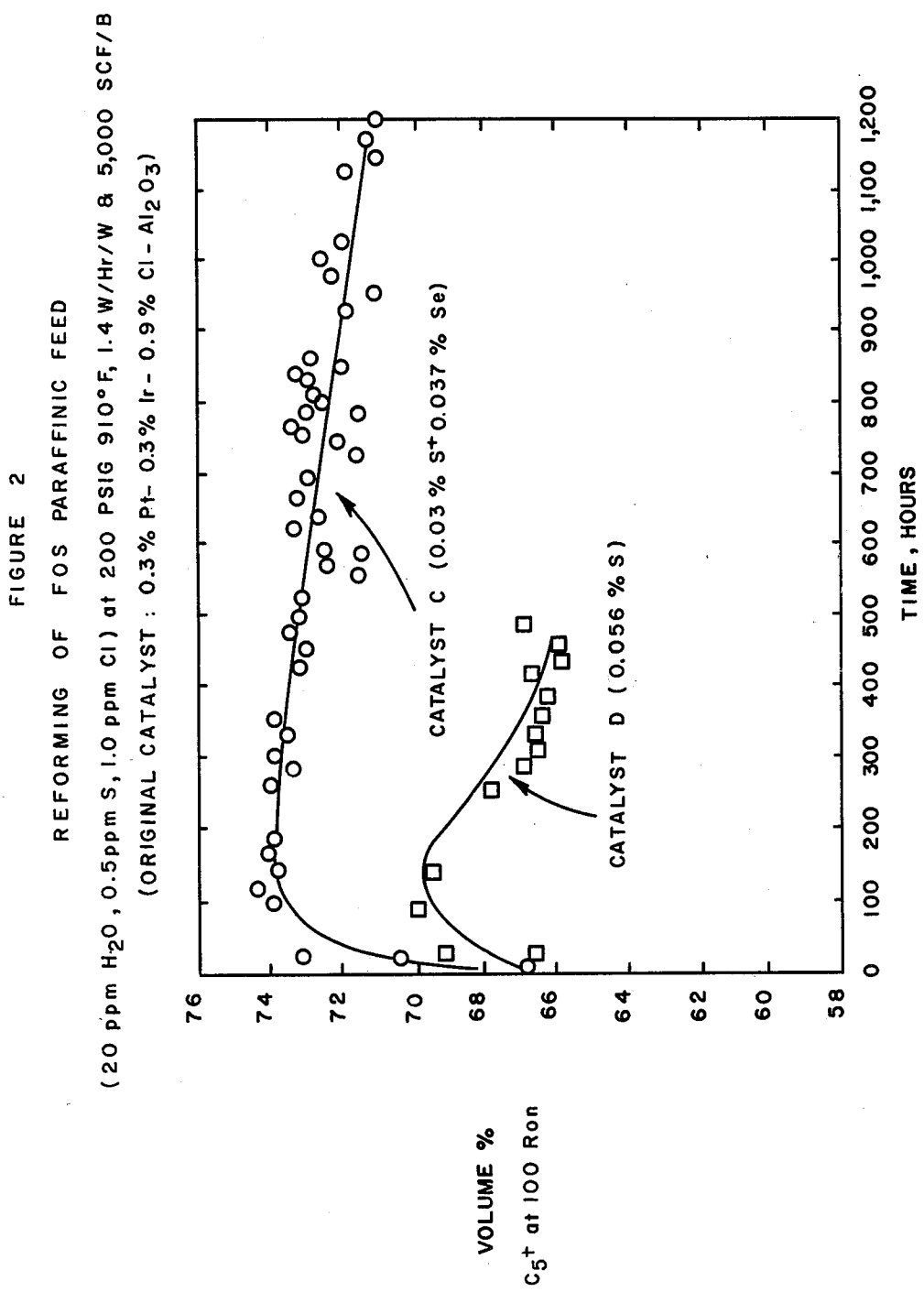

REFORMING WITH MULTIMETALLIC CATALYSTS

This application is a division of application Ser. No. 969,548, filed Dec. 14, 1978, now U.S. Pat. No. 4,213,881, which is a continuation-in-part of application Ser. No. 862,114, filed Dec. 19, 1977, now U.S. Pat. No. 4,148,758, and application Ser. No. 862,116, filed Dec. 19, 1977, now U.S. Pat. No. 4,151,115, each of said '114 and '116 is a continuation-in-part of application Ser. No. 826,996, filed Aug. 23, 1977, and now abandoned.

Catalytic reforming, or hydroforming, is a well-known type of process employed in the petroleum refining industry for improving the octane quality of naphthas and straight run gasolines. In a typical process, a series of reactors are provided with fixed beds of catalyst which receive upflow or downflow feed, and each reactor is provided with a heater, or interstage heater, because the reactions which take place are endothermic. A naphtha feed, with hydrogen, or recycle gas, is concurrently passed sequentially through a reheat furnace and then to the next reactor of the series. The vapor effluent from the last reactor of the series is a gas rich in hydrogen, which usually contains small amounts of normally gaseous hydrocarbons, and it is separated from the $C_5+$ liquid product and recycled to the process to minimize coke production; coke invariably forming and depositing on the catalyst during the reaction.

Reforming catalysts are recognized as dual functional, the catalyst composite including a metal, or metals, or a compound or compounds thereof, providing a hydrogenation-dehydrogenation function and an acidic component providing an isomerization function. The platinum group or Group VIII nobel metals (ruthenium, osmium, rhodium, iridium, palladium and platinum) despite their expense have been recognized as having a combination of properties which make them particularly suitable for reforming operations, and hence certain of these species of catalysts have become widely used in commercial operations. Conventional reforming catalysts have thus long employed platinum composited with an inorganic oxide base, particularly alumina, and in recent years promoters such as iridium, rhenium, germanium, tin, etc., have been added, particularly to platinum, to enhance one or more of certain of the characteristics which a good reforming catalyst must possess—viz., activity, selectivity, activity maintenance and yield stability. Halogen, e.g., chlorine, is generally added to enhance the acid function required of the catalyst.

The principal reactions produced in reforming are: (1) dehydrogenation of naphthenes to produce the corresponding aromatic hydrocarbons, e.g., methylcyclohexane is dehydrogenated to form toluene, (2) isomerization of n-paraffins to form branched-chain paraffins and isomerization of ring compounds, e.g., the isomerization of ethylcyclopentane to form methylcyclohexane, and dehydrogenation of the latter to form toluene, (3) dehydrocyclization of paraffins to form aromatics, e.g., the dehydrocyclization of n-heptane to form toluene, and (4) hydrocracking of high molecular weight feed constituents to form lower molecular weight, or lower boiling, constituents, e.g., the cracking of n-decane to produce $C_3$ and $C_7$ hydrocarbons. The net effect of these reactions is to increase the concentration of aromatics and isomers, with consequent octane improvement of naphthas boiling within the gasoline range.

Hydrogenolysis, a specific and severe form of hydrocracking which produces methane can also occur, and is particularly acute in reforming with the new "multimetallic" catalysts, e.g., platinum-rhenium, platinum-iridium, etc., particularly fresh or regenerated, reactivated catalysts of such type, which are particularly hypersensitive. Exotherms or heat fronts are produced which pass through a catalyst bed at startup, i.e., when new or freshly regenerated, reactivated catalyst is initially contacted with hydrocarbons at reforming temperatures. The temperature excursions or heat fronts are attributed to the hyperactivity of the catalyst which causes excessive hydrocracking of the hydrocarbons, or hydrogenolysis, sometimes referred to as "runaway hydrocracking." These temperature excursions or heat fronts are undesirable because the resultant temperature often results in damage to the catalyst, or causes excessive coke laydown on the catalyst with consequent catalyst deactivation and, if uncontrolled, may even lead to damage to the reactor and reactor internals. The phenomenon is troublesome in any type of reforming operation, but is particularly troublesome in cyclic reforming wherein one reactor of the series is a swing reactor which is used as a substitute for each of the other reactors so that the catalyst of each in turn can be regenerated, and reactivated. Because of the frequency with which the catalysts must be regenerated in cyclic reforming, as contrasted with other type of reforming units, hydrogenolysis, or runaway hydrocracking greatly reduces the efficiency of the cyclic reforming process and simply cannot be tolerated. In fact, because of this problem some of the newer more highly active promoted platinum catalysts, i.e., multimetallic catalysts, are unsuitable in cyclic reforming processes.

It is conventional to presulfide a noble metal reforming catalyst prior to its use in reforming to suppress hydrogenolysis, or runaway hydrocracking, which can cause excessive methane formation, hot spots, temperature excursions, and the like. In presulfiding, it is conventional to charge catalyst into a reactor for contact with an admixture of hydrogen sulfide and an inert gas, e.g., nitrogen. Various difficulties, however, are associated with this practice. One difficulty of such technique, e.g., is that the sulfur is not deposited uniformly on the catalyst. The catalyst at the top of the reactor is heavily sulfided and only lightly sulfided near the bottom of the reactor. Only by sulfiding to the point of breakthrough can the catalyst at the bottom of the reactor be adequately sulfided, this causing the catalyst on the top of the reactor to be over-sulfided. Whereas this non-uniformity and over-sulfiding of the catalyst does not create particularly difficult problems in the use of unpromoted platinum catalysts, it produces particularly acute problems with the new multimetallic catalyst species. Excess sulfur is converted into hydrogen sulfide which is picked up by the recycle gas such that it contaminates the entering feed. This, because of the high sulfur sensitivity of these catalysts, results in more rapid catalyst deactivation and loss of $C_5+$ liquid yields. Moreover, during regeneration, some of the sulfur is oxidized to sulfur dioxide and sulfur trioxide which forms corrosive acids with water introduced into the process and contributes to sulfation of the inorganic oxide or alumina base, resulting in loss of surface area and activitiy.

Another problem is that the new, fresh, or regenerated multimetallic catalysts, especially iridium-containing catalysts, and notably platinum-iridium catalysts, become rapidly overheated when exposed, in the presence of hydrogen, at normal reaction conditions to hydrocarbons, which can crack to produce methane, ethane, propane and butane, to such extent that the catalyst itself can be overheated, sintered or otherwise damaged.

In U.S. Pat. No. 3,884,799 to Mahoney et al., which issued May 20, 1975, there is disclosed a catalyst, and process for using such catalyst for reforming a petroleum hydrocarbon fraction at conventional reforming conditions, which is constituted of a Group VIII noble metal, notably platinum, and rhenium and selenium composited on a refractory inorganic oxide, notably alumina, to which is added a halogen component, notably a chloride. This reference discusses the problem of hydrogenolysis which occurs in reforming during start-up with an unsulfided, or improperly sulfided, halogenated platinum-rhenium catalyst, and it discloses and claims the process of using a catalyst in reforming in which selenium is incorporated therein thereby reducing coke formation and eliminating any necessity of a pre-sulfiding treatment of that particular catalyst to suppress hydrogenolysis during start-up. Moreover, it is suggested that an substantial amount of the selenium is retained on the catalyst during reforming, and subsequently after the catalyst has been subjected to an appreciable number of simulated regeneration cycles. This provides advantages in that the catalyst need not be retreated after each regeneration, and presulfiding of the catalyst becomes unnecessary. U.S. Pat. No. 2,851,399 to Brennan et al. also discloses a reforming catalyst containing platinum and selenium composited with alumina useful in reforming but, inter alia, there is no suggestion of a third hydrogenation-dehydrogenation component.

It is accordingly a primary objective of the present invention to obviate these and other prior art deficiencies and, in particular, to provide the art with a new and improved startup process for upgrading naphthas by reforming with iridium containing catalysts to produce higher octane gasolines.

A further object is to provide a new and improved cyclic reforming process for effecting, at suitable reforming conditions, the production of high octane gasolines while minimizing hydrogenolysis, particularly runaway hydrocracking, especially when employing iridium-containing catalysts, notably platinum-iridium catalysts.

These and other objects are achieved in accordance with the present invention embodying a process comprising incorporating (a) selenium, or a compound or salt or acid of selenium, and (b) sulfurous acid, $H_2SO_3$, or sulfuric acid, $H_2SO_4$, or both, within an iridium-, or rhenium-containing catalyst, the selenium component and the sulfurous or sulfuric acid component, or both, being incorporated at the time of catalyst preparation by contact with a liquid solution, preferably an aqueous solution containing the selenium component and one or both of said sulfurous or sulfuric acid components.

Parent Application Ser. No. 862,116 supra, discloses that excessive hydrocracking can be eliminated by the addition of component (a), supra, to an iridium containing catalyst, and parent Application Ser. No. 862,114, supra, discloses that excessive hydrocracking can be eliminated by the addition of component (b), supra, to an iridium-, or rhenium-containing catalyst. Albeit the sulfurous and sulfuric acid components are effective, however, despite the earlier belief of its permance it has now been found that during a complete run a considerable amount of the sulfur is lost. Consequently, after regeneration for the second cycle, an insufficient quantity of sulfur may be present to prevent the excessive cracking. Selenium, on the otherhand, is a more potent cracking inhibitor than the sulfurous or sulfuric acid components especially with iridium-containing catalysts. Moreover, however, selenium-containing catalysts also promote the aromatization and reforming reactions. The promotion of these reactions occurs simultaneously with the suppression of cracking, this resulting in a significant improvement in yield. Selenium, unlike sulfur, remains with the catalyst during the run subsequent regeneration. This, however, presents a dilemma because the level of selenium necessary to suppress initial exothermic reactions is actually higher than that subsequently desired for promoting the aromatization and reforming reactions as desired during the remainder of the run.

The present invention is based on the discovery that excessive initial hydrocracking can be eliminated by the use of both a sulfurous or sulfuric acid component, or both, and a selenium component. The selenium component is added at levels sufficiently low that the entire run can be conducted at the levels required for optimum yield and activity. The sulfurous or sulfuric acid component is added with the selenium component to the composite in amount sufficient to suppress the initial hydrogenolysis. This is conveniently accomplished by compositing both selenium and a sulfurous acid or sulfuric acid compound, or both, with the catalyst, preferably by addition of these compounds by impregnation. Suitably, sufficient of the compounds are added to incorporate from about 0.01 to about 0.50 percent selenium, preferably from about 0.01 to about 0.08 percent selenium, and from about 0.01 to about 0.30 percent sulfur, preferably from about 0.01 to about 0.08 percent sulfur, based on the total weight of the catalyst (dry basis). The exact concentration of each of the added compounds depends to some extent on the feedstock and reforming conditions. The presence of selenium and the sulfurous or sulfuric acid components are mutually helpful in suppressing, or eliminating the initial hydrocracking. As the run progresses, however, carbon deposition occurs and hydrocracking ceases to be severe problem. The sulfur, during this period is removed by normal process desorption leaving primarily only the selenium at the preferred level. Consequently, yields and activity remain high. In the second cycle hydrocracking is less severe than in the initial cycle and the selenium alone may be sufficient to prevent hydrocracking; or only minimal sulfur may be needed.

Selenium is identified as a Group VIA element (Periodic Table of the Elements; Sargent-Welch Scientific Company, Copyright 1968) having an atomic number of 34 and an atomic weight of 78.96. Exemplary of suitable selenium compounds and salts for this purpose are selenium monochloride, selenium disulfide, selenium sulfuroxytetrachloride, selenous acid, selenic acid, selenium tetrachloride, and the like.

In another of its aspects the present invention embodies a reforming catalyst or catalyst composite comprising a refractory or inorganic oxide support material, particularly alumina, Group VIII noble metal hydrogenation-dehydrogenation component, notably platinum, to which both iridium, selenium and sulfurous acid or sulfuric acid, or both, have been added to promote the activity and selectivity of the catalysts, and said catalyst has been prepared by a method wherein the selenium and sulfurous acid or sulfuric acid, or both, are introduced into and deposited throughout said support. Suitably, the reforming catalyst, or composite also contains a halogen component, particularly chlorine, and preferably the selenium and sulfurous acid or sulfuric acid, or both, components are introduced into the support, or catalyst, by impregnating same with a solution comprising selenium as an element, or a salt or compound thereof, and a sulfurous or sulfuric acid compound.

In accordance with this invention, a porous refractory inorganic oxide support is employed as a suitable impregnation material. The support can contain, for example, one or more of alumina, bentonite, clay, diatomaceous earth, zeolite, silica, activated carbon, magnesia, zirconia, thoria, and the like; though the most preferred support is alumina to which, if desired, can be added a suitable amount of other refractory carrier materials such as silica, zirconia, magnesia, titania, etc., usually in a range of about 1 to 20 percent, based on the weight of the support. A preferred support for the practice of the present invention is one having a surface area of more than 50 m$^2$/g., preferably from about 100 to about 300 m$^2$/g., a bulk density of about 0.3 to 1.0 g/ml, preferably about 0.4 to 0.8 g/ml, an average pore volume of about 0.2 to 1.1 ml/g., preferably about 0.3 to 0.8 ml/g., and an average pore diameter of about 30 to 300 Å.

The metallic component of the Group VIII noble metals of the Periodic Table of the Elements necessarily includes iridium, and one or more platinum group metal components such as ruthenium, rhodium, palladium, osmium, platinum, and the like. Of these latter class of metals, platinum is the preferred component, and platinum-iridium catalyst, the preferred species of catalysts which can be further promoted to increase the normally expected activity and selectivity of these catalysts.

The additional metallic component, or components, is suitably a component selected from the Group IV (Ge, Sn, Pb) metals, Group VI (Cr, Mo, W) metals, Group VII metals, and Group VIII metals. For example, germanium, tin, lead, osmium, ruthenium, or rhodium can be used. Although one or more of these components can be added by any of the conventional methods, it is preferably to add them by an impregnation prior to, following or simultaneously with the impregnation of the Group VIII nobel metal, iridium, selenium or halogen components. The selenium and other promoter metals are added in concentration ranging about 0.1 to 3 percent, preferably from about 0.02 to about 1 percent, based on the weight of the catalyst.

The metal hydrogenation components can be composited or intimately associated with the porour inorganic oxide support or carrier by various techniques known to the art such as ion-exchange, coprecipitation with the alumina in the sol or gel form, and the like. For example, the catalyst composite can be formed by adding together suitable reagents such as a salt of platinum and ammonium hydroxide or ammonium carbonate, and a salt of aluminum such as aluminum chloride or aluminum sulfate to form aluminum hydroxide. The aluminum hydroxide containing the salts of platinum can then be heated, dried, formed into pellets or extruded, and then calcined in nitrogen or other nonagglomerating atmosphere. The metal hydrogenation components can also be added to the catalyst by impregnation, typically via an "incipient wetness" technique which requires a minimum of solution so that the total solution is absorbed, initially or after some evaporation.

It is generally preferred, however, to deposit the Group VIII noble metal, or metals, inclusive of iridium, rhenium, and other metals used as promoters, on a previously pilled, pelleted, beaded, extruded, or sieved particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique embodying absorption from a dilute or concentrated solution, or solutions, with subsequent filtration or evaporation to effect total uptake of the metallic components.

The Group VIII noble metal component, inclusive of rhenium, iridium or other metals used as promoters are each supported on the carrier within the range of from about 0.01 to 3 percent, preferably from about 0.05 to 1 percent, based on the weight of the catalyst. In compositing the Group VIII noble metal with the carrier, essentially any soluble compound can be used, but a soluble compound which can be easily subjected to thermal decomposition and reduction is preferred, for example, inorganic salts such as halide, nitrate, inorganic complex compounds, or organic salts such as the complex salt of acetylacetone, amine salt, and the like. Where the Group VIII noble metal is platinum, platinum chloride, platinum nitrate, chloroplatinic acid, ammonium chloroplatinate, potassium chloroplatinate, platinum polyamine, platinum acetylacetonate, and the like, are preferably used.

The impregnation solution of the noble metal compound, and metals used as promoters, are prepared by dissolving the compounds in water or any other inorganic or organic solvent. The concentration of the metallic component ranges from about 0.01 to 5 percent, preferably from about 0.05 to 1 percent, based on the weight of solution. The pH of the impregnation solution should be controlled to less than about 4, preferably less than 3, by the addition of a suitable inorganic or organic acid. By controlling the pH within these ranges, the components can be effectively dispersed into the inner part of the catalyst. Generally, it is preferred to use a halogen-acid aqueous solution of the noble metals.

In accordance with this invention, the selenium and sulfurous acid or sulfuric acid components, or both, are incorporated into the catalyst at the time of its formation and preferably selenium is incorporated by impregnation of a solution of a soluble salt, acid or compound of selenium into the carrier. This can be carried out simultaneously with, prior to, or following the impregnation of the hydrogenation-dehydrogenation component, or components, into the carrier. Selenium, in accordance with this invention, can be added to the carrier from a solution which contains both the salt, acid or compound of selenium, the Group VIII noble metal hydrogenation-dehydrogenation component, or components, iridium, rhenium, and the inorganic acid suh as HCl. Suitably, the salts or compounds are dissolved in a suitable solvent, preferably water, to form a solution, or each moiety is separately dissolved in a solution, the solutions admixed and the admixed solution used for impregnation of the carrier.

The impregnation of the Group VIII noble metal, iridium, rhenium and selenium components into a carrier is carried out by impregnating the carrier with the solution of the respective salts or compounds of the elements or metals to be incorporated. The amount of impregnation solution used should be sufficient to completely immerse the carrier, usually within the range from about 1 to 20 times of the carrier by volume, depending on the metal concentration in the impregnation solution. The impregnation treatment can be carried out under a wide range of conditions including ambient or elevated temperatures and atmospheric or supratmospheric pressures.

In one preferred embodiment of the present invention a carrier can be impregnated with an aqueous halogen-acid solution of the Group VIII Noble metal, iridium and other compounds, if any, followed by evaporation or filtration and then drying or calcination, or both, and then the metals impregnated catalysts can be impregnated with a solution containing a dissolved salt or compound of selenium and sulfurous or sulfuric acid, or both, followed by evaporation or filtration and then drying or calcination, or both, whereby the selenium and sulfur components can be dispersed substantially uniformly to the inner part of the catalyst.

To enhance catalyst performance, it is also recognized to add a halogen component. Fluorine and chlorine are preferred halogen components. The halogen is contained on the catalyst within the range of 0.1 to 3 percent, preferably within the range of about 0.3 to 2 percent, based on the weight of the catalyst. When using chlorine as a halogen component, it is contained on the catalyst within the range of about 0.2 to 2 percent, preferably within the range of about 0.5 to 1.5 percent; based on the weight of the catalyst. The introduction of halogen into catalyst can be carried out by any method and at any time of the catalyst preparation, for example, prior to, following or simultaneously with the impregnation of the noble metal, iridium, rhenium, or selenium and sulfur components. In the usual operation, the halogen component is introduced simultaneously with the incorporation of the noble metal component. It can also be introduced by contacting a carrier material in a vapor phase or liquid phase with a halogen compound such as hydrogen fluoride, hydrogen chloride, ammonium chloride, or the like.

The catalyst is dried by heating at a temperature above about 80° F., preferably between about 150° F. and 300° F., in the presence of nitrogen or oxygen, or both, in an air stream or under vacuum. The catalyst is calcined at a temperature between about 500° F. to 1200° F., preferably about 500° F. to 1000° F., either in the presence of oxygen in an air stream or in the presence of an inert gas such as $N_2$.

The feed or charge stock can be a virgin naphtha, cracked naphtha, a Fischer-Tropsch naphtha, or the like. Typical feeds are those hydrocarbons containing from about 5 to 12 carbon atoms, or more preferably from about 6 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 20 to about 80 Vol. % paraffins, both normal and branched, which fall in the range of about $C_5$ to $C_{12}$, from about 10 to 80 Vol. % of naphthenes falling within the range of from about $C_6$ to $C_{12}$, and from 5 through 20 Vol. % of the desirable aromatics falling within the range of from about $C_6$ to $C_{12}$.

The reforming runs are initiated by adjusting the hydrogen and feed rates, and the temperature and pressure to operating conditions. The run is continued at optimum reforming conditions by adjustment of the major process variables, within the ranges described below:

| Major Operating Variables | Typical Process Conditions | Preferred Process Conditions |
| --- | --- | --- |
| Pressure, Psig | 50–750 | 100–300 |
| Reactor Temp., °F. | 750–1100 | 850–1000 |
| Gas Rate, SCF/B (Incl. Recycle Gas) | 1500–10,000 | 2000–7000 |
| Feed Rate, W/W/Hr | 0.5–10 | 1–3 |

The invention will be more fully understood by reference to the following demonstrations and examples which present comparative data which illustrate its more salient features; and these data, if desired, can also be compared and contrasted with that given in Application Ser. Nos. 862,116 and 862,114. All parts are given in terms of weight except as otherwise specified.

EXAMPLES 1–4

A commercial platinum-iridium catalyst of the following weight percent composition was dried at 300° F. and calcined in air at 500° F., to wit:

| Components | Commercial Catalyst |
| --- | --- |
| Platinum | 0.3% |
| Iridium | 0.3% |
| Chlorine | 0.9% |
| Alumina | 98.5% |

Catalysts A, B and C respectively, were prepared from portions of the above commercial catalyst by impregnating each with dilute solutions of sulfuric acid, selenous acid and one containing an admixture of sulfuric acid and selenous acid, respectively, to deposit these materials on the catalyst. Catalysts A, B and C are of the following approximate composition, to wit:

| Components | Catalyst A | Catalyst B | Catalyst C |
| --- | --- | --- | --- |
| Platinum | 0.3% | 0.3% | 0.3% |
| Iridium | 0.3% | 0.3% | 0.3% |
| Chlorine | 0.9% | 0.9% | 0.9% |
| Selenium | — | 0.037% | 0.037% |
| Sulfur | 0.03% | — | 0.03% |
| Alumina | 98.4% | 98.4% | 98.4% |

The catalysts were each then contacted at reforming condition in separate runs with a commercially available low sulfur paraffinic naphtha, characterized in Table I as having the following inspections:

TABLE I

| ASTM Distillation, °F. | |
| --- | --- |
| Initial | 145 |
| 10 | 181 |
| 20 | 204 |
| 30 | 222 |
| 40 | 240 |
| 50 | 258 |
| 60 | 275 |
| 70 | 293 |
| 80 | 313 |
| 90 | 334 |

TABLE I-continued

| | |
|---|---|
| Final B.P. | 363 |
| Octane No., RON Clear | 34.8 |
| Gravity, °API | 59.7 |
| Sulfur, Wt. ppm | 0.5 |
| Water, Wt. ppm | 20 |
| Chlorine, Wt. ppm | 1.0 |
| Analysis, Vol. Percent | |
| Paraffins | 69.509 |
| Naphthenes | 18.411 |
| Aromatics | 12.08 |

The reforming runs were carried out to produce close to a 100 RON liquid product, i.e., at 910° F., 200 PSIG, 5000 SCF/Bbl and 1.4 W/Hr/W. The results are given in Table II.

TABLE II

REFORMING OF FOS PARAFFINIC FEED
@ 200 PSIG 1.4 W/H/W AND 5000 SCF/B
(Original Catalyst: 0.3% Pt-0.3% Ir-0.9% Cl-$Al_2O_3$)

| Catalyst | Type and Amount of Additive, Wt. % | Temp., °F. | Volume % $C_5^+$ Yield C 100 RON | | |
|---|---|---|---|---|---|
| | | | @ 6 Hours | @ 25 Hours | @ 550 Hours |
| A | 0.03 S | 900 | 63.4 | 70.3 | 69.1 |
| B | 0.037 Se | 900 | 63.0 | 69.3 | 73.0 |
| C | 0.03 S + 0.037 Se | 910 | 66.8 | 71.3 | 73.1 |

The advantages for the combination of sulfur and selenium addition are clearly illustrated by the results given in Table II. The run conducted with Catalyst A, which contains only 0.03% S by weight, produced a large amount of cracking during the first six hours of operation. This caused such a high loss in $C_5^{30}$ yield that only about 63.4% gasoline of 100 RON was obtained. This excessive cracking during the early part of the run not only caused a high yield loss but also created some dangerous problems in that run temperature can catastrophically increase, this possibly resulting in damage to the catalyst or equipment. Similarly, Catalyst B which contained only 0.037% Se caused excessive initial hydrocracking and yield loss. However, referring to the data given for the run conducted with Catalyst C, which contained both selenium and sulfur, it will be observed that the cracking was greatly diminished even though the temperature was 10° F. higher in this run than in those within which Catalyst A and B were employed. The $C_5^+$ yield at 6 hours with this catalyst was nearly 67% by volume. Furthermore, this yield advantage was maintained over an extended period of time.

To further demonstrate this advantage of the use of the two components, a 1200 hour run was conducted with Catalyst C, and these data contrasted with that of a run at similar conditions made with the commercial platinum-iridium catalyst, supra, which was treated with hydrogen sulfide in conventional manner; the catalyst (Catalyst D) initially containing 0.056 percent sulfur, based on the weight of the catalyst.

The activity results are plotted in FIG. 1 and the yield data in FIG. 2. The remarkable stability of Catalyst C with respect to both activity and yield are clearly evident. In contrast, the activity and yield of Catalyst D are clearly inferior to those of Catalyst C.

After the 1200 hour run shown in FIGS. 1 and 2, the discharged Catalyst C was found to contain 0.035% selenium and 0.016% sulfur. Thus, the selenium is essentially fully retained whereas the sulfur is lost during the run.

It is apparent that various modifications and changes can be made without departing the spirit and scope of the present invention, outstanding features of which are that hydrogenolysis can be suppressed without the use of conventional catalyst presulfiding techniques, and the octane quality of hydrocarbon feedstocks can be upgraded and improved.

Having described the invention, what is claimed is:

1. In a process for reforming a hydrocarbon feed at reforming conditions which comprises contacting said feed with a catalyst which comprises a Group VIII noble metal hydrogenation-dehydrogenation component, a component comprised of iridium, rhenium, or both, and a halogen component, the improvement wherein the catalyst also contains sufficient selenium, and sulfurous acid or sulfuric acid, or both, as components to increase the activity or selectivity, or both, as contrasted with a catalyst otherwise similar except that it does not contain selenium, and sulfurous acid or sulfuric acid, or both, as components.

2. The process of claim 1 wherein the catalyst is comprised of platinum, iridium, selenium, and sulfurous acid or sulfuric acid, or both, as components.

3. The process of claim 1 wherein the catalyst is comprised of platinum, rhenium, selenium, and sulfurous acid or sulfuric acid, or both, as components.

* * * * *